United States Patent [19]

Burns

[11] Patent Number: 5,584,355
[45] Date of Patent: Dec. 17, 1996

[54] ELECTRICAL VEHICLE

[76] Inventor: David J. Burns, Broomall Castle Nursing Home, Menstrie, Clackmannanshire FK11 7EA, Scotland

[21] Appl. No.: 135,995

[22] Filed: Oct. 14, 1993

[30] Foreign Application Priority Data

Oct. 14, 1992 [GB] United Kingdom ............. 9221576
Nov. 3, 1992 [GB] United Kingdom ............. 9223024

[51] Int. Cl.$^6$ ............................................ B60K 25/00
[52] U.S. Cl. ......................... 180/165; 290/55; 322/2 R
[58] Field of Search ............................ 322/2 R; 180/165; 290/44, 55

[56] References Cited

U.S. PATENT DOCUMENTS

| | | |
|---|---|---|
| 3,374,849 | 3/1968 | Redman . |
| 3,556,239 | 1/1971 | Spahn ............................... 180/68 |
| 3,878,913 | 4/1975 | Lionts et al. . |
| 4,141,425 | 2/1979 | Treat ............................... 180/65 DD |
| 4,168,759 | 9/1979 | Hull et al. ........................ 180/65 |
| 4,254,843 | 3/1981 | Han et al. . |
| 4,324,985 | 4/1982 | Oman ............................... 290/55 |
| 4,379,236 | 4/1983 | Inoue ............................... 290/55 |
| 4,424,452 | 1/1984 | Francis ............................. 290/55 |
| 4,970,404 | 11/1990 | Barger ............................. 290/55 |
| 5,280,827 | 1/1994 | Taylor et al. ..................... 180/165 |

FOREIGN PATENT DOCUMENTS

| | | |
|---|---|---|
| 0394565 | 10/1990 | European Pat. Off. . |
| 3226381 | 1/1984 | Germany . |
| 1143698 | 10/1967 | United Kingdom . |
| 1501383 | 2/1978 | United Kingdom . |
| 2050525 | 1/1981 | United Kingdom . |
| 1593969 | 7/1981 | United Kingdom . |
| 2126963 | 4/1984 | United Kingdom . |

*Primary Examiner*—Steven L. Stephan
*Assistant Examiner*—Nicholas Ponomarenko
*Attorney, Agent, or Firm*—Sixbey, Friedman, Leedom & Ferguson, P.C.; Gerald J. Ferguson, Jr.; Donald R. Studebaker

[57] ABSTRACT

An electrical vehicle, especially a car, comprises bodywork (2) with ground engaging wheels (3, 4) for vehicle motion over the ground, the bodywork (2) carrying an electric motor (5) to drive the vehicle via certain of the wheels (3, 4) and batteries (6A, 6B) to power the electric motor (5). The invention provides additional energy generation means comprising a tunnel (8) extending through the bodywork (2) with a turbine fan/alternator set (7) located in the tunnel at the rear of the vehicle whereby electrical energy is generated by the set (7) during vehicle motion to charge the batteries thereby improving the performance of the vehicle, especially with regard to range. The inlet (8A) to the tunnel, of bell-mouth form, at the vehicle front constitutes the major portion of the vehicles frontal area. A special alternator (15) is provided, and the vehicle can also include solar cell means (32) for battery charging.

16 Claims, 5 Drawing Sheets

ELECTRICAL VEHICLE

The present invention relates to electrical vehicles, especially but not exclusively road going vehicles. Battery powered electrical vehicles, for example in the form of cars and vans, are known wherein batteries supply electrical power to an electric motor for driving of the vehicle. These electrical vehicles are becoming increasingly attractive environmentally by virtue of the lack of exhaust emission as is present with I.C. engine powered vehicles, but they have definite disadvantages as regards performance and range which is limited by battery capacity. With a view to overcoming this problem, electrical vehicles of the power regeneration type have been proposed such as shown in GB-A-2126963 and U.S. Pat. No. 3,556,239: these have included a longitudinal air tunnel with an air turbine in the tunnel to be driven by the forward motion of the vehicle, the turbine being coupled to a generator for the production of electricity. It is the principal object of the present invention to provide an improved electrical vehicle of the power regeneration type.

According to the present invention there is provided an electrical vehicle including bodywork, an electric motor for driving of the vehicle, electrical battery means for supplying electric power to the motor, energy generation means comprising a turbine fan of axial flow type and an electrical generator driven by said turbine fan to provide electric power for the vehicle, and ducting in the form of a tunnel passing through the bodywork from the front of the vehicle, said turbine fan being located in said tunnel so as to be positioned in the rearmost half of the vehicle whereby the turbine fan is driven by a substantially unobstructed flow of air in the ducting directed onto the fan due to vehicle motion, said tunnel including a bell mouth front opening portion whereat the sides of the tunnel converge rearwardly in plan while the top surface of the tunnel extends downwards and rearwardly at the front whereby the open front end of the tunnel has an area at least half of the maximum cross-sectional area of the vehicle, the bottom of the tunnel being substantially level and located at the floor of the bodywork, a tunnel input section leading to said turbine fan, the space at at least one side of said input section of the tunnel serving for passenger accommodation or as storage space, for example for the electrical battery means.

Preferably the fan means includes a rotatable conical hub, with fan blades mounted on the hub. The electrical generator (having a stator and a rotor) can be located within the hub, with the rotor of the generator coupled to the hub.

In a preferred embodiment, sets of batteries extend longitudinally at the sides of the bodywork, passenger accommodation being centrally located between said battery sets. The electric motor can drive at least one selected ground engaging wheel, and preferably a pair of front wheels.

Embodiments of the present invention will now be described by way of example with reference to the accompanying drawings wherein.

Figure 1:
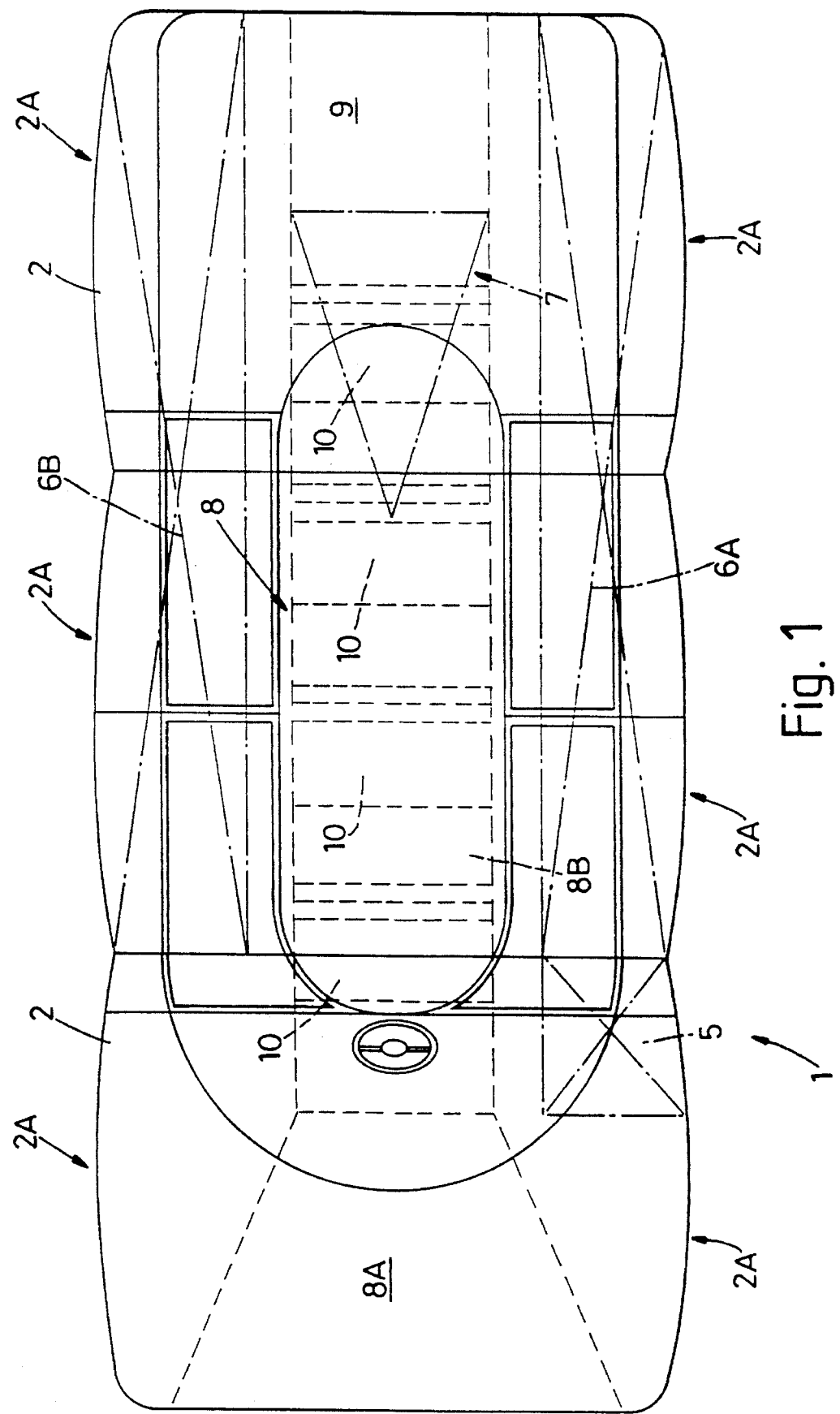
FIG. 1 shows a plan view of an electric car in accordance with the present invention.
Figure 2:
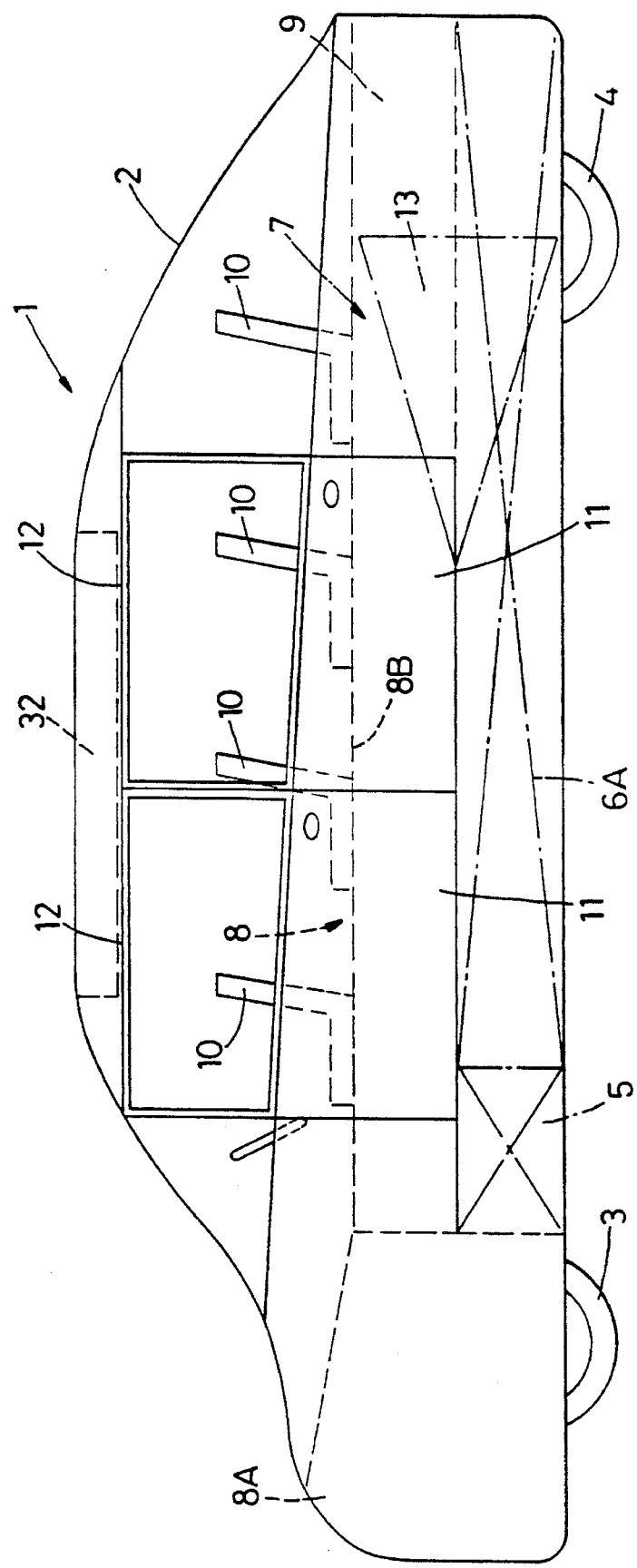
FIG. 2 shows a side elevation of the electric car of FIG. 1.
Figure 3:
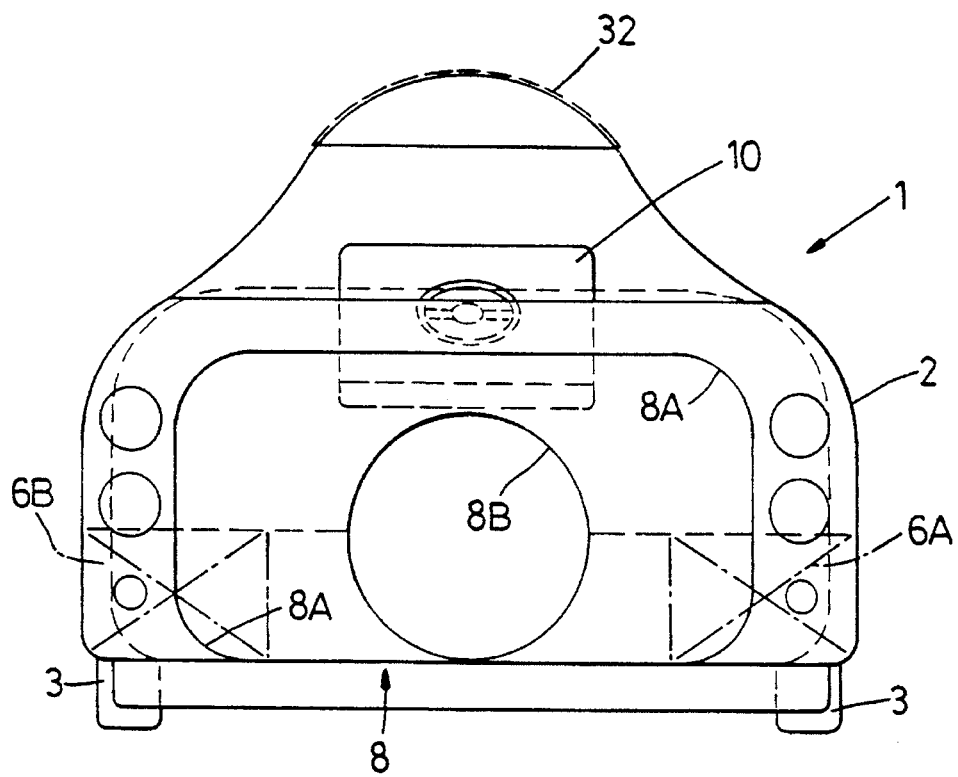
FIG. 3 shows a front view of the car.

Referring to FIGS. 1 to 3, an electrical car 1 comprises bodywork 2, pairs of ground engaging wheels 3, 4 front and rear, an electric motor 5 driving the front wheels 3 through a suitable transmission (not shown) and electrical battery sets 6A, 6B for supplying electrical power to the motor 5. Suitable control gear (not shown) adapted for operation by the car driver serves to control operation of the electric motor 5 and hence motion of the car 1.

Additional energy generation means are provided in the car and comprise an air turbine fan/alternator set 7 located at or towards the rear of the car 1, first ducting 8 leading from the front of the car through the bodywork 2 to the turbine/alternator set 7, and discharge ducting 9 from the set 7, the ducting 8 serving for the passage of air to the turbine by virtue of motion of the car 1 for driving of the turbine. The ducting 8 located centrally in the car comprises an inlet bell-mouth portion 8A and a following tunnel portion 8B leading to the turbine 7, the battery sets 6A, 6B being located adjacent the sides of the bodywork 2, on either side of the tunnel portion 8B. In this example seating 10 for the driver and passengers is located longitudinally along the tunnel portion 8B.

As can be seen from FIG. 3, the front area of the bell-mouth 8A constitutes the major portion of the frontal cross-sectional area of the bodywork 2, representing more than half the bodywork frontal area. The bell-mouth 8A could be readily increased to the size shown dashed in FIG. 3. The cross-sectional area of the tunnel portion 8B will be selected at a suitable value compatible with the seating and other arrangements of the car. For example the tunnel 8B could have a cross-sectional area of about 1.13 m$^2$, obtained for example by having the circular cross-section shown of a diameter of about 600 mm.

The ducting 8 could be arranged to constitute a major support structure (chassis) of the bodywork, i.e. define a spine form chassis member. Access to the passenger compartment is via "gull" wing doors 11 each upwardly pivotal about an upper longitudinal axis 12.

Figure 4:
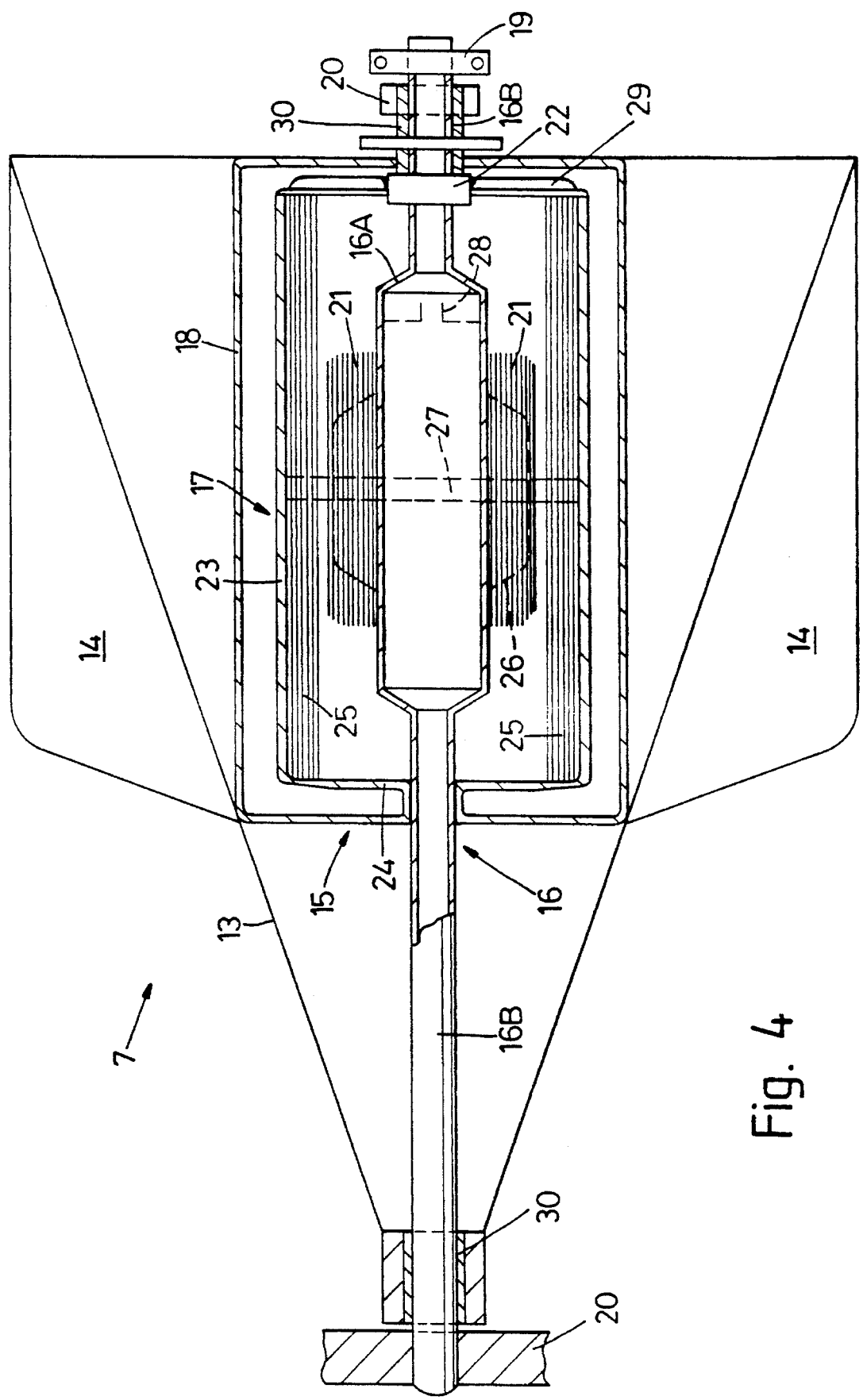
FIG. 4 shows a sectional elevation, to a larger scale, of one form of air driven turbine/alternator suitable for the car of FIGS. 1 to 3.

The turbine/alternator 7 comprises a fan drum 13 of conical form carrying fan blades 14 (see FIG. 4), the cone with its apex forward encouraging a smooth air-flow from the tunnel portion 8B onto the turbine fan 13/14. The fan 13/14 and the alternator advantageously constitute a rotary unit defining an electrical generator. FIG. 4 shows a suitable arrangement. Thus, the alternator 15 comprises a central stationary shaft 16 of hollow form, a drum 17 surrounding the shaft 16 and rotating thereon, and an outer casing 18 which rotates with the drum 17. The shaft 16 is located by support blocks 19 bolted to suitable supports 20 and comprises a central larger diameter position 16A carrying field windings (coils) 21 and small diameter end portions 16B on which the drum 17 rotates, roller bearing assemblies 22 being provided for an improved bearing function between the shaft/drum, while the drum 16 comprises an outer ring plate 23 for example 0.25 in (6.36 mm) thick and end walls 24.

Figure 5:
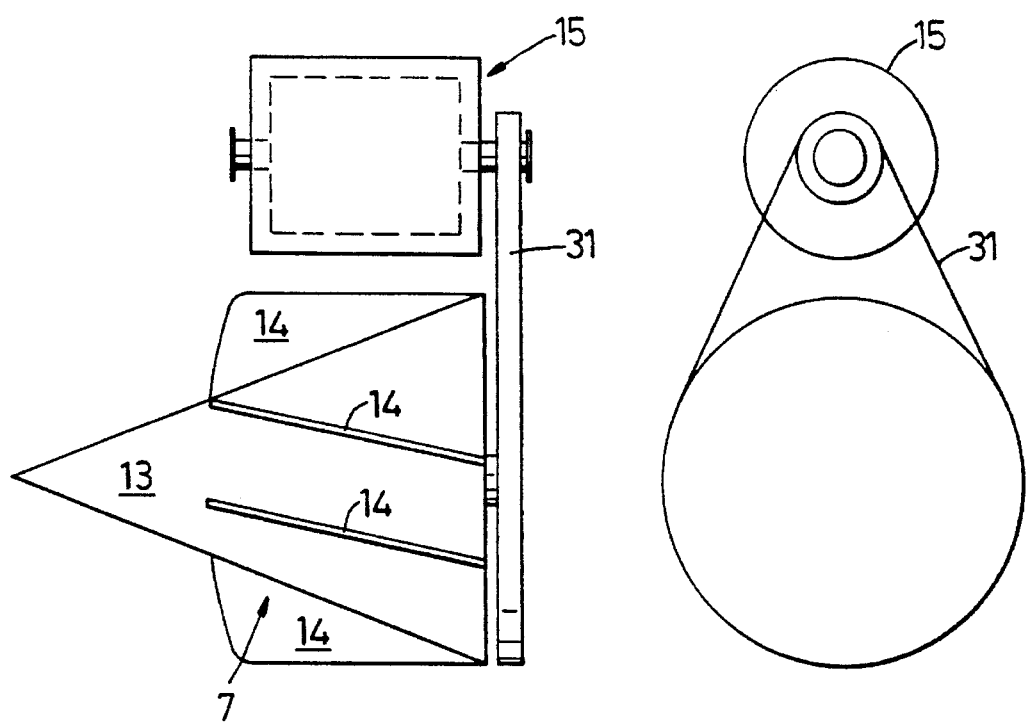
FIG. 5 shows an alternative generator arrangement.
Figure 6:
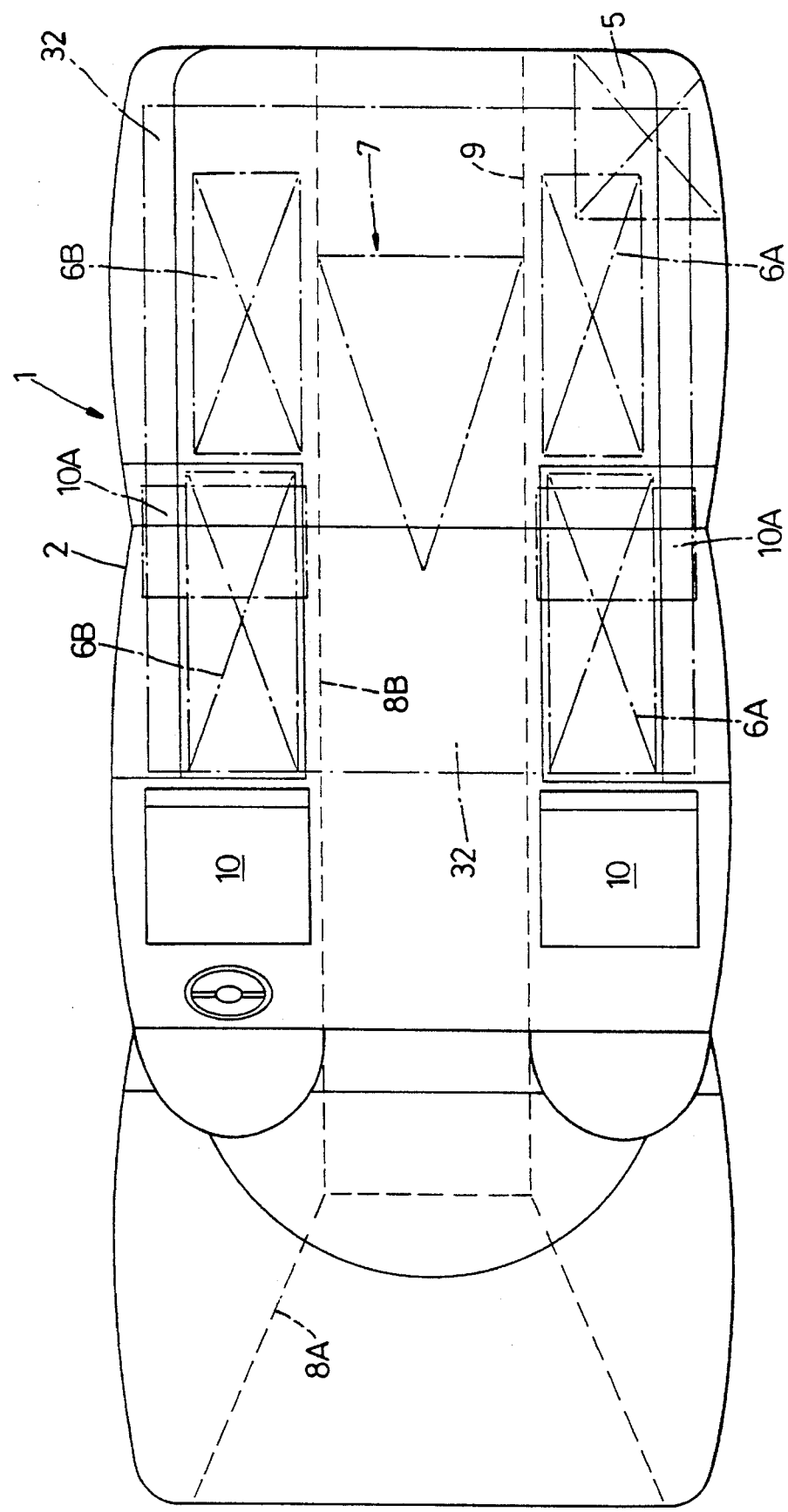
FIG. 6 shows the electric car of FIG. 1 but with modifications.

Wire coils 25 are provided on the inner faces of the ring plate 8 and can constitute the poles of the alternator 15. The shaft portion 16A can carry bosses 26 to facilitate location of the coils 21, and both the coils 21 and 25 can be of copper wire. A brass or copper ring 27 is located over the coils 25 at the ring 23 and co-operates with brushes (not shown) for lead-off of electric current generated by the alternator 15. Alternatively pick up could be located in the central shaft 16 with output leads 28 passing through a hollow end portion 16B. Fan blades 29 can be fitted on the drum 3 for additional cooling purposes. The conical fan drum 13 is rotably mounted on the shaft 16 at bearings 30 and the casing 18 is coupled to the drum 13 to rotate therewith. The use of the hollow shaft 16 leads to considerable weight saving but without loss in electrical output, while the arrangement of the drum 17 enables an increased amount of copper wiring to be installed at the ring 23, and this will produce increased electrical output from the alternator. The coils are of copper and the other alternator parts can be suitable material, in particular the ring 23 can be of steel. The turbine/alternator 7 serves to charge the battery sets 6A, 6B during motion of the car. In particular the fan drum 13 is driven by the air flow through the ducting 8, increased effect being present where the car is driven into the wind, and by having the turbine 7 at the rear of the car the turbine 7 will be influenced by the naturally produced reduced pressure conditions at the rear of the car to give improved fan performance. The battery sets 6A, 6B will be such as to provide the desired driving capacity, but charging of the batteries 6A, 6B by the turbine/alternator 7 during driving of the car will substantially reduce the charge reduction of the batteries during travel, so giving increased range. Charging of the batteries 6A, 6B from an external source e.g. mains supply need only be carried out at increased intervals. It would be possible to have the motor 5 powered by one of the battery sets 6A, 6B while the other set is being charged by the turbine/alternator 7. The batteries will be of suitable voltage, e.g. 12 v, 24 v or 240 v. A motor 5 of suitable horsepower will be selected e.g 20 H.P. but motor power will be chosen to give the desired maximum car speed which could be 70 M.P.H. (38 KM/HR) or even greater. Providing the bodywork 2 with curving (bowed) external wall portions 2A should improve the aerodynamics at higher speeds. It will be appreciated that the large-size smooth-form opening at bell-mouth 8A will enable airflow to pass smoothly through the car thereby reducing the air resistance of the bodywork 2. FIG. 5 shows a modified arrangement of the turbine/alternator where the alternator 15 is separate from the fan drum 13, with a belt drive 31 from the drum 13 to the alternator 15 thereby permitting a substantial speed step up to the alternator. The alternator 13 of FIG. 5 could be similar to that of FIG. 4, the belt-drive 31 being coupled to the rotary drum 17 of the alternator, the casing 18 in this case being stationary. FIG. 6 shows a modification where the seats 10 are at the sides of the tunnel portion 8B so enabling a substantial reduction in the overall height of the car but it may be necessary to increase the car width for this arrangement. Occasional seats 10A may be provided above the battery sets and further it may be preferred to have the motor 5 driving the rear wheels 4 for this example.

Additional charging of the batteries could be obtained by employing solar cell panelling 32 on the bodywork, and this panelling may be expandable and also swingable so as to be settable to catch the sun rays. The panelling 32 could charge dedicated batteries.

Whereas the above embodiments concern a car, the present invention could be applied to other vehicles e.g. in vans and trucks, and also in railway vehicles (power units/locomotives) even in high-speed boats.

It could be possible to have the alternator 15, especially as shown in FIG. 5 driven by some other power source than the fan turbine 13/14, for example simply by fitting the belt drive 31 to the power source to drive the alternator 15. Also, the windings (coils) of the alternator 15 could be of a material other than copper, for example silver or a silver alloy including for example platinum or titanium.

We claim:

1. An electrical vehicle including bodywork, an electric motor for driving of the vehicle, electrical battery means for supplying electric power to the motor, energy generator means comprising a turbine fan of axial flow type and an electrical generator driven by said turbine fan to provide electric power for the vehicle, and ducting in the form of a tunnel passing through the bodywork from the front of the vehicle, said turbine fan being located in said tunnel so as to be positioned in the rearmost half of the vehicle whereby the turbine fan is driven by a substantially unobstructed flow of air in the ducting directed onto the fan due to vehicle motion, said tunnel including a bell mouth front opening portion whereby the sides of the tunnel converge rearwardly in plan while the top surface of the tunnel extends downwards and rearwardly at the front whereby the open front end of the tunnel has an area at least half of the maximum cross-sectional area of the vehicle, the bottom of the tunnel being substantially level and located at the floor of the bodywork, a tunnel input section leading to said turbine fan, a space at at least one side of said tunnel input section for accommodating at least one of vehicle passengers and storage space.

2. An electrical vehicle as claimed in claim 1, wherein said turbine fan includes a hub and an electrical generator located within said hub so as to be driven by said fan to provide electrical power for the vehicle.

3. An electrical vehicle as claimed in claim 1, wherein the turbine fan means and the generator are in the form of a unit.

4. An electrical vehicle as claimed in claim 1, wherein the turbine fan means includes a rotatable conical hub, with fan blades mounted on the hub.

5. An electrical vehicle as claimed in claim 4, wherein the electrical generator is located within the conical hub, with a rotor of the generator coupled to the hub.

6. An electrical vehicle as claimed in claim 1, wherein sets of batteries extend longitudinally at the sides of the bodywork.

7. An electrical vehicle as claimed in claim 6, wherein passenger accommodation is centrally located between said battery sets.

8. An electrical vehicle as claimed in claim 1, wherein passenger seating is provided at the side of said ducting.

9. An electrical vehicle as claimed in claim 1, wherein a discharge duct is located at the discharge from the fan means and discharges at the rear of the bodywork.

10. An electrical vehicle as claimed in claim 1, wherein passenger seating is located over said ducting.

11. An electrical vehicle as claimed in claim 4, wherein the rotatable hub drives an alternator via a belt drive or similar.

12. An electrical vehicle as claimed in claim 1, further comprising solar cell means for charging the battery means.

13. An electrical vehicle as claimed in claim 1, including an electrical alternator having a central, winding carrying, shaft of hollow form.

14. The vehicle as claimed in claim 13, wherein the hollow shaft is located so as to be stationary and a drum form rotor is provided rotatable about the stationary central shaft.

15. The vehicle as claimed in claim 13, wherein the drum is housed in a casing which rotates with the rotor.

16. The vehicle as claimed in claims 13, wherein the hollow shaft has a central larger diameter portion supporting electrical windings and small diameter end portions providing beatings for the drum, said end portions extending outwardly from the casing.

\* \* \* \* \*